F. G. HAYWARD.
DRIVING MEANS FOR GRAMOPHONES.
APPLICATION FILED JUNE 5, 1911. RENEWED DEC. 23, 1912.

1,057,344.

Patented Mar. 25, 1913.

Witnesses
Oliver W. Holmes
E. B. McBath

Inventor
F. G. Hayward,
By Chas E. Bivck
Attorney

UNITED STATES PATENT OFFICE.

FREDRICK G. HAYWARD, OF NEW YORK, N. Y.

DRIVING MEANS FOR GRAMOPHONES.

1,057,344. Specification of Letters Patent. Patented Mar. 25, 1913.

Application filed June 5, 1911, Serial No. 631,228. Renewed December 23, 1912. Serial No. 738,363.

*To all whom it may concern:*

Be it known that I, FREDRICK G. HAYWARD, a citizen of the United States, residing in New York city, in the State of New York, have invented a new and useful Improvement in Driving Means for Gramophones, of which the following is a specification.

This invention relates to an improvement in friction disk drive mechanism, which I have shown applied to a gramophone, but which is capable of being adapted for use in connection with other machines in which it is desired to maintain a uniform rotation of some particular part, but at the same time to permit regulation of the speed of rotation of the said part.

The object of this invention is to so improve frictional driving means as to provide for a substantially constant pressure upon the driving face of a transmitting disk even though certain of the friction wheels coöperating therewith may be shifted in relation to each other or the axis of the shaft upon which said disk is mounted.

More specifically stated, my object is to provide a driving means for gramophones or other machines which includes a shaft, a transmitting disk thereon, a driving means for said disk having substantially constant pressure on the face of the disk on one side of the shaft, and a counterbalancing means acting upon said disk on the other side of said shaft, said counterbalancing means including a wheel shiftable radially of the disk but providing for a substantially constant pressure upon the disk notwithstanding said adjustment or shifting.

Figure 1:
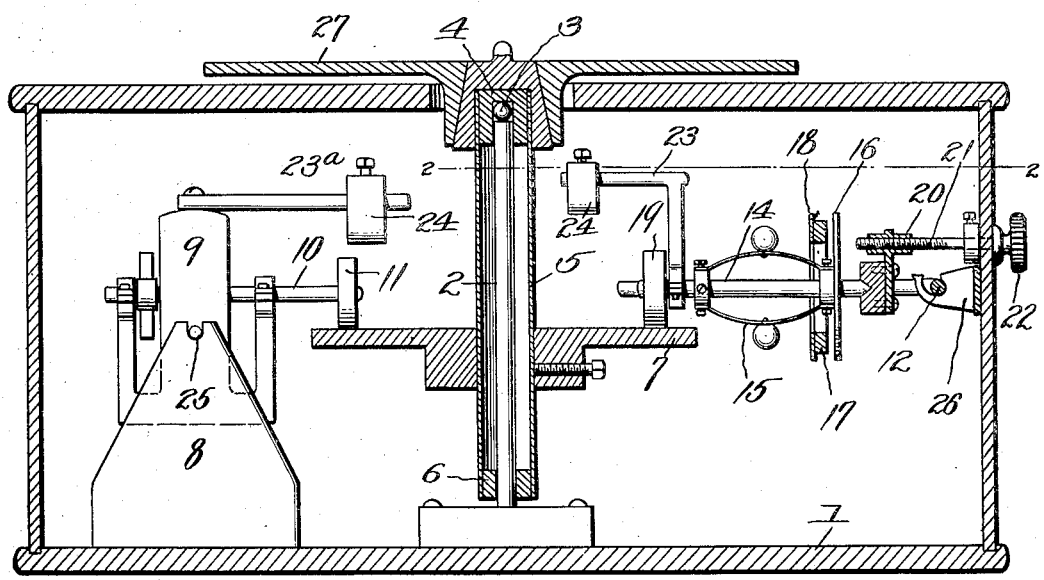
Figure 2:
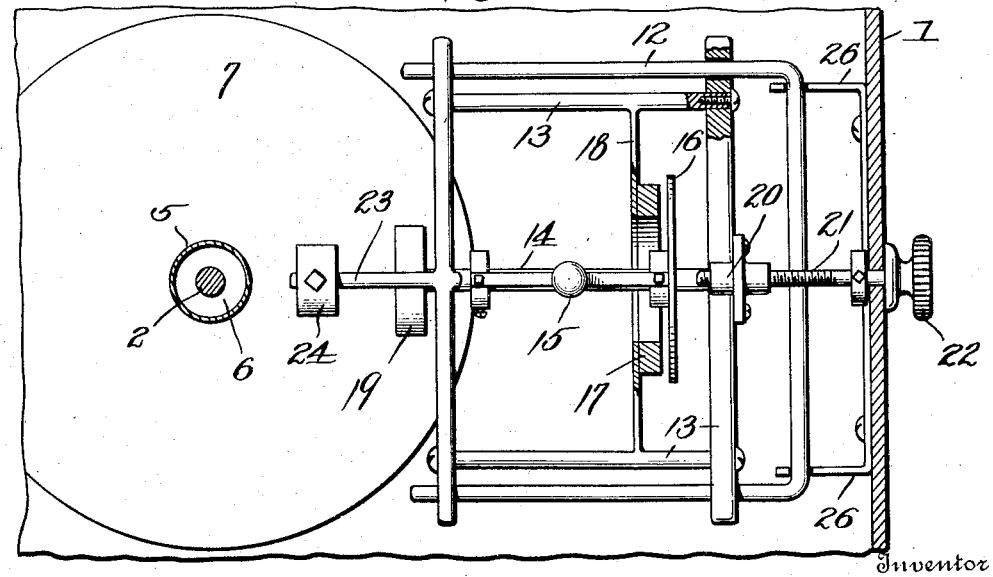

The invention consists in the novel features of construction hereinafter described, pointed out in the claims and shown in the accompanying drawings, in which, Figure 1 is a vertical section through any suitable machine casing, the parts being shown in elevation. Fig. 2 is an enlarged sectional view upon the line 2—2 of Fig. 1, and looking downward.

In these drawings, 1 represents a casing in which is fixed centrally a vertical shaft 2, which shaft is stationary mounted. Upon the upper end of this shaft is a ball 3, upon which rests a cap 4, which cap incloses and turns upon the upper portion of the shaft 2. This cap carries a depending sleeve 5, and in the lower end of said sleeve is arranged a collar 6, which also turns loosely upon the shaft 2. The sleeve 5 constitutes a tubular shaft upon which is fixed a disk 7, which may be of any suitable material, and the upper face of which may be provided with a rubber layer. Upon one side of the disk 7 and hung in a suitable bracket 8 is a motor 9 driven from any suitable source of power. The motor shaft 10 is provided with a friction wheel 11, which bears upon and rotates the disk 7.

In the governors which are usually employed with machines of this type, the brackets are moved farther away or closer to a rotating disk in order to regulate the speed, or adjust the action of the governor. In my construction, I employ a suitable frame 12, upon which is slidably mounted a second frame 13. Upon a central shaft 14, carried by the movable frame 13, is placed a ball governor 15, of the kind now commonly employed. Connected to the governor, slidable upon the shaft is the brake or friction disk 16. This coöperates with a friction ring 17, carried by a cross bar 18, of the frame 13, and movable with said frame. It will be observed at this point, that as the shaft 14, governor 15 and the friction devices 16 and 17, are all carried by the frame 13, movement of said frame of itself along the frame 12 will not change the relative position of these parts carried by it. The shaft 14 is provided with a friction wheel 19, which also bears upon the friction disk 7. A suitable threaded head 20 is connected to the frame 13, and movement of said frame so as to produce a radial movement of the shaft 14, with respect to the disk 7, is effected by means of a threaded rod 21, provided with a knurled nut 22 upon the exterior of the casing 1. In order to properly counter-balance the weight of the friction wheels 19 and 11 upon the disk 7, and therefore insure perfect working of the device, brackets 23 and 23ª, extend inwardly respectively from the frame 13 and motor 9, so as to overhang the disk 7, and these brackets carry adjustable weights 24. In connection with these weights, it will be noted that the motor 9 is hung in suitable bearings as indicated at 25, and the frame 12, which supports the frame 13, is also pivotally hung at its outer end in a suitable bracket 26. A suitable turn-table 27, for supporting the record is carried by the sleeve 5. When it is desired to regulate the speed, it is only necessary to turn the nut 22, thereby sliding the frame 13, thus causing the friction disk 19 to move farther toward or away from the center of the disk 7 according to the adjustment to be made.

In this type of machinery it is important that the vertical shaft 5 will be so mounted and supported as to be substantially frictionless, and from the foregoing description of the mechanism it will be appreciated that I provide a means whereby the disk 7, which is connected to said shaft 5, may be driven by a wheel and suitable source of power, the contact between said wheel and the disk being at a substantially constant pressure, while at the same time the adjustment of the usual centrifugal speed governor, whereby the rate of rotation of the disk and shaft may be varied, will not destroy the delicate counterpoise of the shaft. In other words, I provide a counterbalancing means of such nature that the effective pressure of the driving wheel on one side of the shaft remains substantially equal to the corresponding pressure of the driven wheel on the other side of the shaft even though the weight applied to the driven wheel remote from the driving wheel is applied at varying distances from the axis of rotation of the shaft and disk.

Having thus fully described my invention, what I claim as new and desire to secure by Letters Patent, is:—

1. In a device of the kind described, a governor, a friction brake comprising a non-rotatable and a rotatable member, a driven disk, a friction wheel engaging said disk, and driving said governor, and means for moving said friction wheel radially upon the disk, the governor and the brake mechanism being also movable.

2. In a device of the kind described, a friction disk, means for driving said disk, a shaft movable radially with respect to the disk, a friction wheel upon said shaft in engagement with the disk and a governor mechanism carried by and movable with said shaft.

3. In a device of the kind described, a friction wheel, means for driving said friction wheel, a disk driven by said friction wheel, a shaft movable radially with respect to the disk, a second friction wheel fixed upon the said shaft, and in engagement with the disk, and a governor mechanism carried by and movable with said shaft.

4. In a device of the kind described, a pair of pivotally supported frames, a motor driven shaft journaled in one of the frames, a governor shaft journaled in the other pivoted frame, a friction wheel thereon, a rotatable disk in engagement with said friction wheel, means to drive the disk from the first-mentioned shaft, counterbalance weights carried respectively by said frames, and means for moving the governor shaft radially with respect to the disk.

5. In a device of the kind described, a disk, means for driving said disk, a pivoted frame, a frame slidable upon the first mentioned frame, a shaft carried thereby, a friction wheel upon said shaft, said friction wheel bearing upon the disk, a governor mechanism carried by the shaft and slidable frame, and means for sliding said frame for the purpose of moving the friction wheel toward or away from the center of said disk.

6. In driving means for gramophones, the combination of a vertical shaft, a driving disk thereon, driving means acting upon the upper side of the disk on one side of the shaft, and substantially constant counterbalance means acting upon the upper side of the disk on the opposite side of the shaft, said counterbalance means including a governor adjustable toward or from the axis of the vertical shaft.

7. In frictional driving means, the combination of a shaft, a driving disk thereon, pivotally supported driving means for the disk on one side of the shaft, governor mechanism for the disk on the opposite side of the shaft and including means to adjust the governor toward or from the shaft, and weight means to maintain a substantially uniform counterbalance between the driving means and the governor means throughout all usual adjustments of the latter.

8. In a device of the character set forth, the combination of a shaft, a transmitting member thereon, driving means for said member having substantially constant relation therewith on one side of the shaft, a governor for the transmitting member on the other side of the shaft including means to adjust the same toward or from the shaft, and means associated with the governor establishing a substantially constant effective relation between it and the transmitting member irrespective of said adjustment.

9. In a frictional driving device, the combination of a shaft, a driving member thereon, a driving wheel bearing with substantially constant pressure on the face of the driving member on one side of the shaft, governor mechanism including a wheel bearing upon said driving member face at a point remote from the first-mentioned wheel, means to adjust the governor wheel radially of said face, and means maintaining the pressure of the governor wheel upon said face substantially equal to that of the driving wheel in all positions of adjustment of the governor wheel.

10. In frictional gearing, the combination of a shaft, a disk thereon, a plurality of wheels operating upon one face of the disk, means to vary the relative distances between the shaft and the respective wheels, and counterbalance means serving to maintain a substantially equal and constant pressure between both of said wheels and the disk notwithstanding said variation in distances.

FREDRICK G. HAYWARD.

Witnesses:
FRED HULBERG,
VAN CLEEF BISHOP.